Patented Jan. 14, 1936

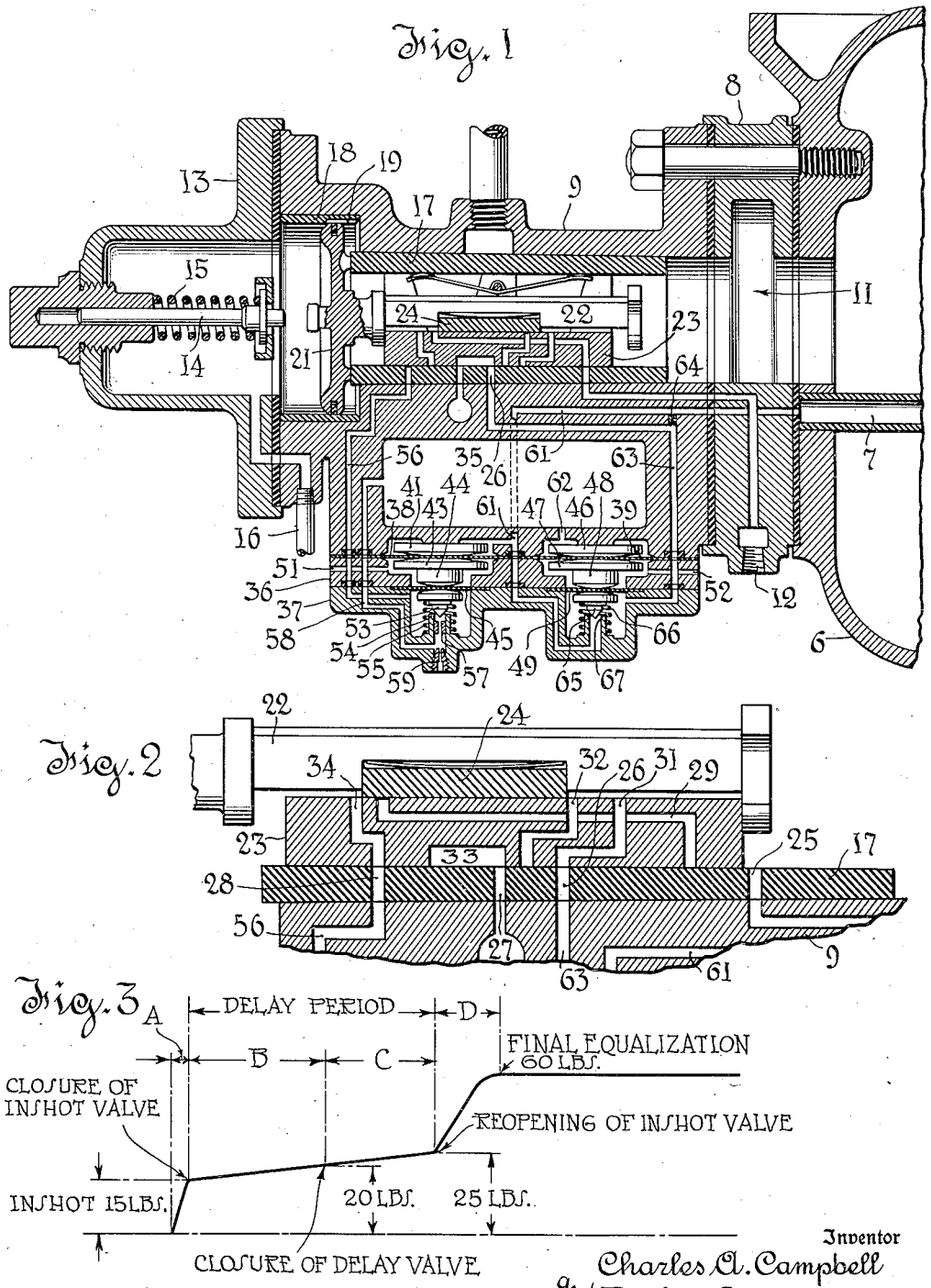

2,027,469

UNITED STATES PATENT OFFICE 2,027,469

AIR BRAKE

Charles A. Campbell, Watertown, N. Y., and Parker Dodge, Chevy Chase, Md., assignors to The New York Air Brake Company, a corporation of New Jersey Application February 27, 1933, Serial No. 658,852

13 Claims. (Cl. 303—46)

This invention relates to air brakes and particularly to methods of and means for timing the operations of what are known as inshot valves.

In order to avoid objectionable slack action in heavy applications, and particularly emergency applications, it is considered good practice to control the rate of development of brake cylinder pressure, and the valve which controls the pressure development is commonly called an "inshot valve." When the inshot valve is open a high rate of flow is permitted. When it is "closed" a slow rate of flow is permitted, usually by a by-pass leading through or around the valve. Thus, in effect, the valve closes only partially, and the term "closed" as applied to the inshot valve, is used hereinafter in a relative sense to include partial or complete closing. The inshot valve is commonly used in conjunction with a triple valve or its equivalent.

The most economical way to time the operation of the inshot valve is to subject it to control by brake cylinder pressure. This procedure ensures that all the air is usefully applied, but is unsatisfactory because piston travel (and consequently effective cylinder volume) is variable as the result of variable slack in the brake rigging.

The obvious alternative is to time by charging a fixed volume, the air so used commonly being wasted. One feature of the present invention is to extend the timing period attainable with a given volume by timing over successive charge and discharge periods. In this way a long period of timing is secured with a relatively small timing chamber without using unduly restricted flow orifices.

Another feature of the invention is the use of abutments of small displacement to operate the inshot valve, or any other valve responsive to pressure in the timing chamber. Flexible diaphragms are characterized by small displacements, and their use permits the use of a small timing volume.

These two features individually, and particularly in combination, result in marked economies.

Other features of invention will be apparent from a consideration of the detailed description which follows.

The invention is applicable wherever it is desired to control the rate of pressure development, but will be described, for purposes of explanation, as used in combination with a triple valve to control the development of brake cylinder pressure in emergency applications.

In the drawing,—

Fig. 1 is a vertical axial section through a triple valve, of the two-reservoir type, with the invention applied. The triple valve is in release position.

Fig. 2 is a fragmentary view of portions of the triple valve, on an enlarged scale. The triple valve is in emergency application position.

Fig. 3 is a time pressure diagram, showing the development of brake cylinder pressure in emergency applications.

In Figs. 1 and 2 the porting is diagrammatic, the ports being drawn, according to a familiar convention, as if they all lay in the same plane.

Referring first to Fig. 1, an ordinary auxiliary reservoir of the freight type is shown at 6. It is provided with a mounting face on its rear end from which leads the usual brake cylinder pipe 7. A filler piece 8 is interposed between this mounting face and the body 9 of the triple valve, suitable ported gaskets being interposed to secure tight joints, as is clearly indicated in the drawing.

The interior of the auxiliary reservoir 6 communicates with the slide valve chamber of the triple valve by way of a passage 11 formed in the mounting face and the filler piece. The filler piece 8 offers an attachment at 12 for a pipe, not shown, leading to a supplemental reservoir of ordinary form. The outer end of the body 9 is closed by a front cap 13, of ordinary form, and having the usual graduating stem 14 and graduating spring 15. The brake pipe connection is indicated at 16.

The slide valve chamber is provided with a bushing 17 and there is the usual cylinder bushing 18 provided with a charging groove 19 of ordinary form. Working in the bushing 18 is a triple piston 21 having a stem 22. This actuates the slide valve 23, the slide valve being permitted limited lost motion with reference to the stem 22. The stem 22 also actuates a graduating valve 24 which is slidable on the top or back of the slide valve 23. The graduating valve 24 is closely confined in a notch in stem 22 so that it partakes of all the reciprocating motions of piston 21. The bushing 17 is provided with a seat for the slide valve 23 and that seat is ported as follows:

The supplemental reservoir port 25 is connected by a passage with the connection 12. There is a brake cylinder port 26, an exhaust port 27, and a timing port 28. The slide valve is provided with a charging port 29, which in release position registers with the supplemental reservoir port 25, and is controlled by the outer (left hand) end of the gradulating valve 24. There is an emergency port 31, which in emergency position registers with the brake cylinder port 26. Port 31 is not controlled by the graduating valve 24. There is a service port 32, which in service position registers with the brake cylinder port 26. Port 32 is controlled by the graduating valve in the usual manner. There is an exhaust cavity 33, which in release position connects the brake cylinder port 26 with the exhaust port 27. There is a charging port 34 for the timing chamber, which in emergency position registers with the port 28.

Except for the charging ports 28 and 34, the construction of the triple valve, so far described, involves no features for which novelty is here claimed.

Formed in the lower portion of the body 9 is a small timing chamber 35. Below this there are mounted a filler piece 36, and a cap piece 37, which house the diaphragm and valve chambers hereinatfer described, the general construction being clearly shown in the drawing. The body 9 and the filler piece 36 form with the cap 37 two diaphragm chambers, each of which is subdivided by corresponding flexible diaphragms. A single sheet of flexible material serves both as a gasket and as the flexible portion of two abutments or diaphragms 38 and 39. The diaphragm 38 has clamped to its center a thrust member made up of two connected disks 41 and 43, each of which is convex on the side presented to the diaphragm. The function of these disks is to ensure smooth flexure of the diaphragm. The lower disk 43 carries a downwardly presented convex button 44 which bears on the upper side of another flexible diaphragm 45 smaller in area than the diaphragm 38. The diaphragm 45 is clamped between the filler piece 36 and the cap 37.

The diaphragm 39 has clamped to its center two disks 46 and 47, similar to the disks 41 and 43, the disk 47 having a convex thrust button 48, similar to the button 44, and bearing on the upper side of a diaphragm 49 smaller than the diaphragm 39 and clamped between the filler piece 36 and the cap 37.

The space between the diaphragms 38 and 45 is vented to atmosphere at 51, and the space between the diaphragms 39 and 49 is vented to atmosphere at 52.

Mounted in the chamber below the diaphragm 45 is a pin valve 53, called the delay valve, and having a convex head which seats against the lower face of the diaphragm 45. The delay valve 53 coacts with a seat 54 and is urged away from its seat by a coil compression spring 55. A passage 56 connects the charging port 28 with the space beneath the diaphragm 45. A choke 57 controls the rate of flow through the seat 55 to a passage 58 which leads directly to the chamber 35. The chamber 35 is continuously vented to atmosphere by way of a choke port 59, whose flow capacity is substantially less than the flow capacity of the choke 57. A convenient location for the choke 59 is that shown in the drawing, i. e., immediately below the choke 57, so that the venting flow is from the port 58, the port being, as already stated, in free communication with the chamber 35. The space above the diaphragm 38 is in free communication with the brake cylinder pipe 7, by way of passage 61.

It follows that the valve 53 may be urged in a closing direction by brake cylinder pressure acting downward on the larger diaphragm 38, and is urged upward by the compression spring 55. When port 34 registers with port 28 the small diaphragm 45 is subject in an upward direction to pressure in the slide valve chamber of the triple valve. The upper side of the diaphragm 39 is subject to pressure in the chamber 35 arriving by way of port 62. The space below the smaller diaphragm 49 is connected by way of passage 63 with the port 26. The passages 63 and 61 are connected by a choke 64.

Mounted in the chamber below the diaphragm 49 is a pin valve 65 which has a convex head in thrust relation with the lower side of diaphragm 49. It is urged in an opening direction by a coil compression spring 66. The valve 65 is the inshot valve and by coacting with its seat 67 controls flow from the passage 63 to the passage 61.

OPERATION

*Release and recharge (see Fig. 1)*

In this position port 33 bridges ports 26 and 27, permitting release flow from the brake cylinder to occur. Charging flow from the brake pipe occurs by way of the charging groove 19 and slide valve chamber. Flow to the auxiliary reservoir is directly by way of passage 11. Flow to the supplemental reservoir is by way of ports 29 and 25.

*Service application*

Upon a service reduction of brake pipe pressure the graduating valve 24 first moves to expose the service port 32. The slide valve 23 is then picked up and shifted to bring port 32 into registry with the port 26. Chamber 35 is at such time uncharged, being open to atmosphere through choke 59. Consequently free service flow occurs by way of port 26, passage 63, past valve 65 to passage 61, and thence to the brake cylinder through pipe 7. Some flow will also occur through the choke 64, as will be obvious. The piston is arrested in service position by the graduating stem 14 and the graduating valve 24 will act to graduate service flow in the usual manner.

*Emergency application*

If brake pipe pressure be reduced at an emergency rate, piston 21 will move outward, overpowering the graduating spring 15 and seating on the front cap gasket, as usual. This positions the graduating valve and slide valve as shown in Fig. 2. The supplemental reservoir port 25 is exposed so that the supplemental reservoir is directly connected with the slide valve chamber, and together with the auxiliary reservoir, furnishes air for the emergency application. The emergency port 31 registers with the port 26 and the port 34 registers with the port 28. The first effect is to permit air from the two reservoirs to flow through the ports 31 and 26 to passage 63, thence past valve 65 to passage 61 and pipe 7 leading to the brake cylinder. This is free flow such as occurs in service application. At the same time, however, flow starts through the ports 34 and 28, passage 56, past valve 53 and choke 57 to the passage 58 which leads to the timing chamber 35. The dimensions of the chokes 57 and 59 are so chosen that in a definite time interval, represented at A in Fig. 3, the pressure in the chamber 35 will rise sufficiently to cause the inshot valve 65 to close.

The closure of the inshot valve 65 is indicated by the legend on Fig. 3, and for purposes of explanation, is assumed to occur when brake cylinder pressure reaches a value of 15 pounds. The inshot valve 65 will close before the chamber 35 is completely charged, and charging of the chamber will continue until brake cylinder pressure acting through the port 61 on the upper side of diaphragm 38, closes the delay valve 53. This closure is indicated by the legend "Closure of delay valve" on Fig. 3, and is indicated as occurring when brake cylinder pressure has reached a value of 20 pounds per square inch. This value is, of course, controlled by a suitable choice of the strength of the springs and the areas of the diaphragms. It is subject to modification, according to the operative characteristics desired.

When the delay valve 53 closes, the supply of air to the chamber is terminated so that the pressure in the chamber 35 starts to fall as a result of the venting action of the constantly open choke 59. Since the pressure in the chamber 35 is acting on the upper side of the diaphragm 39 to hold the inshot valve 65 closed, the fall of pressure in the chamber 35 ultimately results in reopening of the inshot valve 65. While the valve was closed the rate of flow to the brake cylinder was limited to the capacity of the choke 64. When the valve 65 reopens, and this is indicated on the diagram of Fig. 3 "Reopening of inshot valve", free flow to the brake cylinder is restored and brake cylinder pressure rises rapidly to a value indicated on the diagram as 60 pounds, but actually dependent on the pressure of equalization between the brake cylinder and the two reservoirs, which then are in free communication. The actual pressure of final equalization, of course, is dependent on piston travel in the brake cylinder, but under normal conditions it will approximate 60 pounds.

*General considerations*

From the foregoing description of the sequence of events in an emergency application, it will be seen that as soon as the triple valve moves to emergency position, there is a restricted charging flow to a small timing chamber 35. This chamber is constantly vented to atmosphere but at a rate less than the rate of supply. This flow will continue until brake cylinder pressure reaches a definite value, here assumed to be 20 pounds, at which pressure the supply of air to the chamber 35 is terminated by closing of the delay valve. Closing of the delay valve does not cause the inshot valve to open immediately, but permits the bleeding action of the choke 59 to predominate so that the opening of the inshot valve occurs after a time interval determined by the bleeding of the chamber 35. If the piston travel in the brake cylinder is variable, and it is in practice, the pressure attained by the time the inshot valve closes will vary, being less for long piston travels than it is for short piston travels, but the duration of time represented by the interval A on the diaphragm, will be constant. This interval is determined by the time necessary to charge the chamber 35 sufficiently to close the inshot valve.

The delay period during which flow is limited to the capacity of the choke 64 is made up of two successive parts, represented as B and C on the diagram. The period B is the time necessary for brake cylinder pressure to rise from the initial inshot pressure to 20 pounds, and is variable because the initial inshot pressure is variable. The second interval, indicated as C on the diagram, is ordinarily constant, because in the intervals A and B, the chamber 35 will ordinarily be charged to the pressure existing in the slide valve chamber. Consequently the interval C is the time necessary for the pressure in the chamber 35 to drop from the pressure of full charge in the chamber 35 to a value determined by the relative areas of the diaphragms 39 and 49 and the strength of the spring 66. The interval D is merely the time necessary for final equalization to occur under conditions of free flow.

It will be obvious from a consideration of the construction that the pressures attained at different points in the diagram, and the time intervals, can be controlled by suitable selection of the strength of the springs and the areas of the various diaphragms, subject, however, to slight variations as above set forth.

Since the timing action of the chamber 25 is distributed over a charging period and a succeeding discharge period, it is possible, with a given size chamber and given capacities for the chokes 57 and 59, to secure a longer time interval than can be secured by merely charging the chamber or merely discharging it. Furthermore, since the diaphragm 39 has only a very small displacement, movements of the diaphragm do not materially affect the pressure in the chamber 35. This feature is a contributing factor to the possibility of using a small chamber. Since the air in the chamber is not usefully applied, and since the aggregate of volume of the chambers in a long train is considerable, any reduction of the size of the chamber is a matter of substantial importance.

Various changes may be made in the application of the inventive concept, and the detailed description above given is intended to be illustrative and not limiting.

What is claimed is,—

1. The method of controlling the development of pressure in a brake cylinder, which consists in controlling the rate of flow of air to the brake cylinder in response to the rise and subsequent fall of pressure in a chamber which is first gradually charged and then gradually discharged, and controlling the change from such charge to such discharge in response to the development of pressure in the brake cylinder.

2. The method of controlling the development of pressure in a brake cylinder, which consists in controlling the rate of flow of air to the brake cylinder in response to the rise and subsequent fall of pressure in a chamber which is first gradually charged and then gradually discharged, the chamber being constantly vented at a restricted rate and the change from charge to discharge being effected by terminating a predominant supply flow.

3. The method of controlling the development of pressure in a brake cylinder, which consists in controlling the rate of flow of air to the brake cylinder in response to the rise and subsequent fall of pressure in a chamber which is first gradually charged and then gradually discharged, the chamber being constantly vented at a restricted rate and the change from charge to discharge being effected by terminating a predominant supply flow in response to a definite rise of brake cylinder pressure.

4. The method of timing successive reverse movements of an inshot valve for air brakes, which consists in subjecting the valve to control by pressure in a normally uncharged volume continuously vented at a restricted rate, charging such volume at a slightly more rapid rate as an incident to application of the brakes, and terminating such charging in response to the development of a definite braking pressure.

5. The method of timing the closing and subsequent opening of a normally open inshot valve for air brakes, which consists in subjecting the valve to control by pressure in a normally uncharged volume continuously vented at a restricted rate, charging such volume at a slightly predominant rate as an incident to application of the brakes, and terminating such charging in response to the development of a definite braking pressure.

6. The method of timing successive reverse movements of an inshot valve for air brakes, which consists in subjecting the valve to control by pressure in a normally uncharged volume and producing a pressure wave in said volume by charging it gradually as an incident to the development of initial braking pressure, and then discharging it gradually in response to the attainment of a definite partial braking pressure.

7. The method of timing a delayed pressure build-up cycle for air brakes in which the flow is initially rapid, then restricted and finally rapid, which consists in timing the moment of change to restricted flow by the time of gradually charging to a definite pressure a volume subject to slow leakage; terminating charging flow to said volume; and timing the moment of restoration of rapid flow by the depletion of pressure in such charged volume occasioned by said leakage.

8. The method of timing a delayed pressure build-up cycle for air brakes in which the flow is initially rapid, then restricted and finally rapid, which consists in timing the moment of change to restricted flow by the time of gradual charging to a definite pressure a volume subject to slow leakage; terminating charging flow to said volume in response to the partial development of brake cylinder pressure; and timing the moment of restoration of rapid flow by the depletion of pressure in such charged volume occasioned by said leakage.

9. The combination of a brake valve having an air supply connection and a brake cylinder connection, said valve having an application position in which it supplies air from said supply connection to said brake cylinder connection and at a restricted rate to a timing chamber; a timing chamber supplied thereby and having a constantly open restricted vent the flow capacity of the vent being less than that of the supply; two valves, one a delay valve serving when closed to arrest charging flow to said timing chamber, the second an inshot valve serving when closed to limit the rate of flow to the brake cylinder connection; means biasing said delay and inshot valves in an opening direction; pressure actuated means subject to brake cyilnder pressure for urging the delay valve in a closing direction; and pressure actuated means subject to timing chamber pressure for urging the inshot valve in a closing direction.

10. The combination defined in claim 9 in which the pressure actuated means are each of the diaphragm type.

11. The combination defined in claim 9 in which the pressure actuated means are each of the differential diaphragm type, the smaller area diaphragm being subject to supply pressure.

12. In a pressure build up control device for use with air brake cylinders, the combination of pressure actuated means for controlling the rate of flow of air to the brake cylinder; a timing chamber having a restricted vent, said pressure actuated means being subject to the pressure in said chamber; and pressure actuated means subject to brake cylinder pressure and serving to change the rate of supply of air to said chamber in inverse relation to the change of brake cylinder pressure.

13. fhe combination of claim 12 in which the first named pressure actuated means comprise a diaphragm of small displacement relatively to the volume of the timing chamber.

CHARLES A. CAMPBELL.
PARKER DODGE.